United States Patent [19]

Alcaraz et al.

[11] Patent Number: 4,889,210

[45] Date of Patent: Dec. 26, 1989

[54] ROBOTIC PRODUCT SERVER AND SYSTEM

[75] Inventors: Alfonso Alcaraz; Gerardo Aguilar; Mauricio Gonzalez, all of Coronado; Antonio Elizarraraz, San Diego, all of Calif.

[73] Assignee: Cofusa Enterprises, Inc., Chula Vista, Calif.

[21] Appl. No.: 200,731

[22] Filed: May 31, 1988

[51] Int. Cl.⁴ ............................................. E04H 3/00
[52] U.S. Cl. ......................................... 186/38; 186/52; 901/7; 901/50
[58] Field of Search ......................... 186/38, 39, 52, 35, 186/36; 221/88; 194/205; 901/1, 3, 6–8, 50

[56] References Cited

U.S. PATENT DOCUMENTS

| 3,937,057 | 2/1976 | Trolle | 901/6 X |
| 4,598,810 | 7/1986 | Shore et al. | 194/205 |
| 4,762,455 | 8/1988 | Coughlan et al. | 901/8 X |

FOREIGN PATENT DOCUMENTS

| 191636 | 8/1986 | European Pat. Off. | 194/205 |
| 249367 | 12/1987 | European Pat. Off. | 194/205 |
| 557964 | 7/1977 | U.S.S.R. | 186/38 |
| 2119992 | 11/1983 | United Kingdom | 194/205 |

OTHER PUBLICATIONS

Unicorn-1 Robot, *Radio Electronics*, Jan. 1981.
Burgers by Robots, *Robotics World*, Jun. 1985.

Primary Examiner—Kevin P. Shaver
Attorney, Agent, or Firm—Brown, Martin, Haller & McClain

[57] ABSTRACT

A robot for serving a product dispensed from a product dispenser to a customer including a processor and a robotic arm. The processor stores a predetermined instruction set and generates command signals according to the instruction set. The robotic arm is responsive to certain ones of the command signals for transferring the dispensed product from a product dispense location to a position adjacent the customer for removal by the customer. The robot may further comprise a communications system for storing a set of predetermined messages and is responsive to certain other ones of the command signals for announcing selected ones of the messages. Furthermore, the robot may further include a transport system for transferring the dispensed product from the position adjacent the customer, the product dispense location and the position adjacent the customer beyond reach of the customer, to a position within reach of the customer.

16 Claims, 3 Drawing Sheets

ROBOTIC PRODUCT SERVER AND SYSTEM

BACKGROUND OF THE INVENTION

I. Technical Field

The present invention relates to a robotic service system. More specifically, the present invention relates to a novel and improved robot for interfacing between a product dispensing machine and a customer for serving the customer a dispensed product.

II. Background Art

In areas such as shopping malls, movie theater lobbies and theme parks, refreshments are typically served from booths by human operators. The operator typically takes the customer order, receives payment and provides the requested product to the customer. In many situations, the refreshment booths includes a manually operated product dispenser, such as a soda dispenser or soft ice cream dispenser. In other situations, the soda dispenser may be automated such that the soda is dispensed automatically from the product dispensing machine without, the assistance of the operator. In these applications, the operator merely selects the requested product for the customer and delivers the dispensed product to the customer.

In a human operator attended refreshment stand, delays may be incurred in product delivery from the dispensing machine due to human factors. Various causes of delays include the operator not understanding the selection as requested by the customer or the making of change from the product payment.

The marketing of the product and attractiveness of the display are primary features, in many cases, in attracting customers. The conventional human operator attended booth has many limitations to the extent in which techniques may be used to attract customers. In many situations, the visual presentation of the booth is the only feature which may be permitted to attract customers.

It is, therefore, an object of the present invention to provide a novel robotic product server capable of serving multiple customers simultaneously.

It is yet a further object of the present invention to provide a fully automated product dispensing system using a robotic operator as an interface between the product dispenser and the customer for delivering the product therebetween.

It is still a further object of the present invention to provide an audio and visually stimulating product serving system.

SUMMARY OF THE INVENTION

The present invention comprises a robot for serving a product dispensed from a product dispensing machine to a customer. The robot includes processor means for storing a predetermined instruction set and for generating command signals according to certain instructions in the instructions set. Robotic arms are responsive to certain ones of the command signals for moving the dispensed product from a location where it is dispensed, typically beyond the reach of a customer, to a location adjacent the customer for removal by the customer. The system may further include customer controls that are responsive to the customer payment and product selection, to which the robot processor and product dispensing machine operate accordingly. A speech system may be coupled to the processor means to annunciate promotional and selection request signals to potential and current customers.

In many applications the processor is coupled to the product dispenser and the customer controls for controlling the dispensing of the product from the product dispenser along with the robotic delivery of the dispensed product to the customer.

BRIEF DESCRIPTION OF THE DRAWINGS

These and other features, objects, and advantages of the present invention will be more fully apparent from the detailed description set forth below when taken in conjunction with the drawings in which like reference characters identify correspondingly throughout and wherein.

DETAILED DESCRIPTION OF THE PREFERRED EMBODIMENTS

Figure 1:
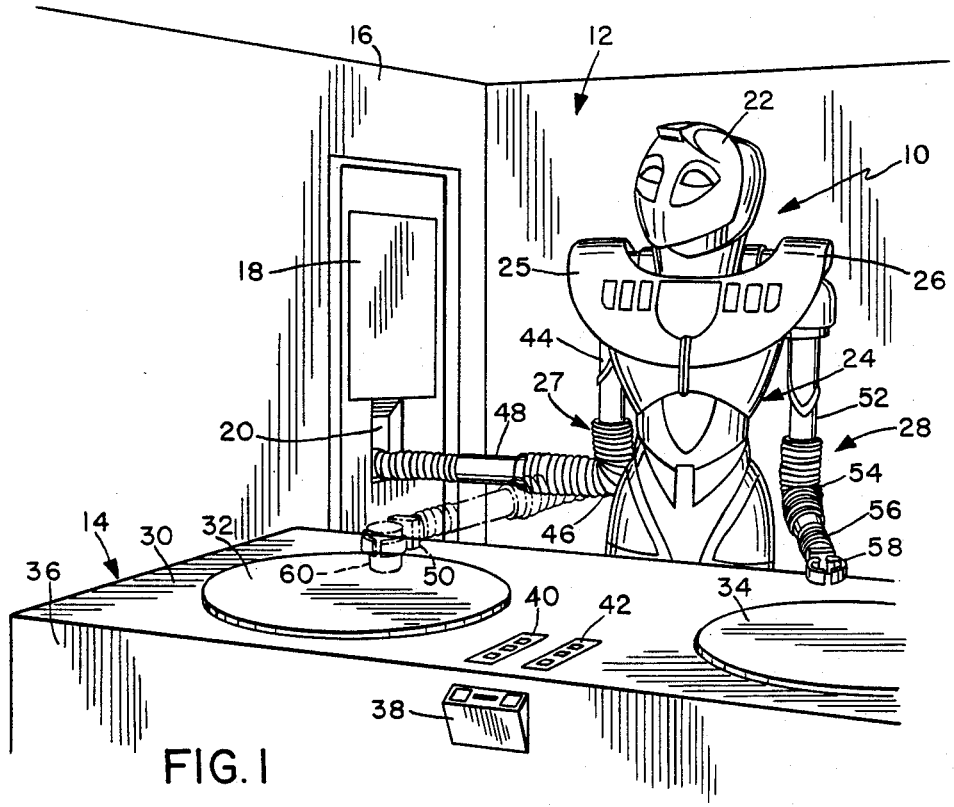
FIG. 1 illustrates a typical robot in a product serving environment.
Figure 2:
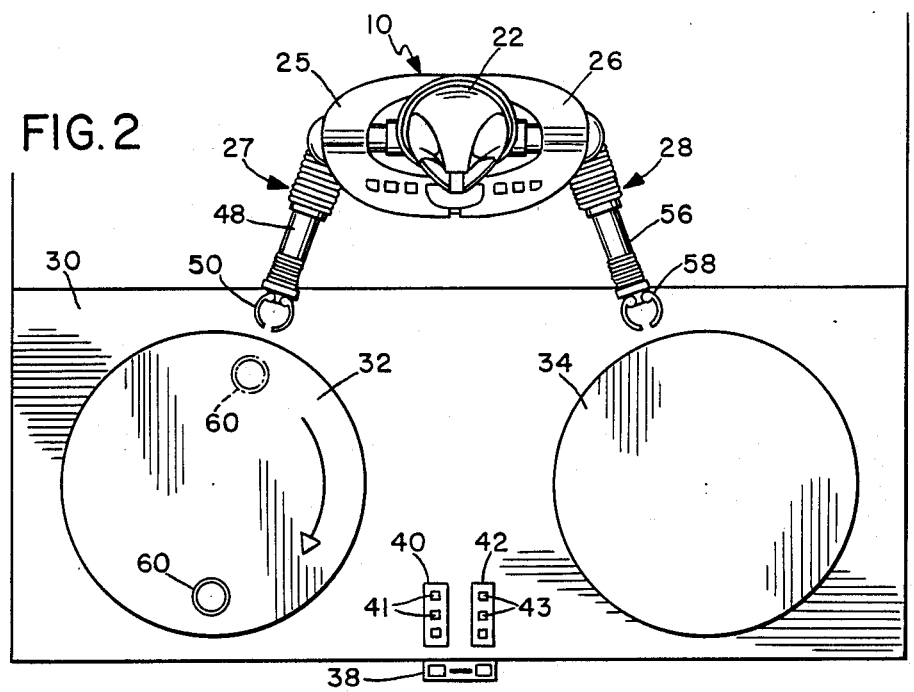
FIG. 2 is a top plan view of the arrangement of FIG. 1, with the robot in a rest position.

The present invention comprises a novel robotic product server for serving a product from a dispensing machine to a customer. Referring now to FIGS. 1 and 2, there is shown a robot 10 placed in a booth 12 behind counter 14. Mounted in wall 16 of booth 12 is a product dispenser 18. As illustrated in FIG. 1, product dispenser 18 dispenses soft drinks and is of the nature of dispensing the soft drink into a cup which is provided into a product dispense location 20 prior to the dispensing of the soda into the cup. Although only one product dispenser is illustrated, it is envisioned that a multiplicity of product dispensers may be placed within booth 12.

Robot 10 includes a rotatable head mounted atop robot body 24. Coupled at shoulder portions 25 and 26 at upperside locations of body 24 are a pair of arms, arms 27 and 28. Robot 10 is typically positioned in booth 12 behind counter 14 to avoid customers directly contacting robot 10 and interferring with its operation. Each arm is typically associated with a product dispenser. For example, arm 28 is located in the region adjacent product dispenser 18. Arm 27 is associated with another product dispenser (not shown). However, each arm may operate in conjunction with several product dispensers.

Mounted upon a top surface 30 of counter 14 are a pair of rotating carousels 32 and 34. Robot 10 uses arm 27 to transfer the dispensed product from product dispense location 20 to a location on carousel 32 beyond the reach of the customer. Carousel 32 rotates so as to deliver the dispensed product to a location within reach of the customer whereupon the customer may take possession of the dispensed product. Similarly, robot 10 uses arm 28 to transfer the product dispensed by an additional product dispenser (not shown) that is associated with arm 28 to carousel 34. Carousel 34 then delivers the product from the robot to the customer. Both robot arms 27 and 28 respectively place the dispensed products on carousels 32 and 34 beyond the reach of the customer. This type of delivery format is used to further ensure that the customer does not interfere with the operation of the robot. Although carousels 32 and 34 are illustrated as rotatable members, other types of mechanisms such as conveyer belts may be used to deliver the product from robot 10 to the customer.

Mounted in a front surface 36 of counter 14 is coin box 38. Mounted in top surface 30 of counter 14 are a pair of selector panels 40 and 42. Panel 40 is associated with product dispenser 18. Similarly, panel 42 is associated with a second product dispenser (not shown). Each of panels 40 and 42 respectively includes a series of selection buttons 41 and 43. After depositing money or tokens in the coin box, the customer depresses a button in one of the selector panels to make a product selection.

Referring still to FIGS. 1 and 2, in FIG. 2 robot 10 is illustrated with arms 27 and 28 in a rest or home position. When arms 27 and 28 are in the home position, they are approximately thirty degrees from a plane extending from the front to back of robot 10.

Arm 27 includes an upper arm portion 44, elbow portion 46 and forearm portion 48. Upper arm portion 44 is connected at an upper end thereof to shoulder portion 25 which is located on one upper side of body 24. The opposite or lower end of upper arm portion 44 is coupled at elbow portion 46 to one end of forearm portion 48. Mounted at the end of forearm portion 48 opposite elbow portion 46 is gripper or hand 50. Arm 28 is of similar construction as that of arm 27. Arm 28 includes an upper arm portion 52, elbow portion 54 and forearm portion 56. Upper arm portion 52 is connected at an upper end thereof to shoulder portion 26 which is located on the other upper side of body 24 opposite shoulder portion 25. Coupled to the lower end of upper arm 52 opposite shoulder portion 26, is elbow portion 54. Elbow portion 54 is also coupled to one end of forearm portion 56. The end of forearm portion 56 opposite elbow portion 54 is coupled to gripper or hand 58. Both upper arm portions 44 and 52 are respectively coupled to shoulder portions 25 and 26 of body 24, as described later, for rotation about a respective vertical axis. Forearm portions 48 and 56 are extensible members respectively coupled by elbow portions 46 and 54 to upper arm portions 44 and 52. Forearm portions 48 and 56 are configured for extending outwardly in a direction opposite a respective elbow portion and retracting inwardly from the extended position. Extension and retraction of forearm portions 48 and 56 is typically in a horizontal plane.

In FIG. 1, upper arm portion 44 is rotated from the home position as illustrated in FIG. 2 such that forearm portion 48 is at an angle of approximately perpendicular to a plane running from the front to back of body 24. Furthermore, forearm portion 48 is extended into product dispense location 20 of product dispenser 18. Hand 50 when positioned in product dispense location 20 grasps the dispensed product.

Upon completion of the dispensing of the product, such as soda into cup 60, forearm portion 48 retracts from product dispense location 20. Forearm portion 48 retracts a predetermined distance such that when upper arm 44 rotates back towards the home position, hand 50 and cup 60 held therein does not contact product dispenser 18. Upper arm 44 rotates towards the home position portion with forearm portion 48 extending a predetermined distance so as to place cup 60 upon carousel 32. The extension of forearm 48 for the placement of cup 60 upon carousel 32 is illustrated in dashed lines in FIG. 1. Hand 50 is then opened and forearm portion 48 retracts back to the home position, as illustrated in FIG. 2. The initial placement of cup 60 upon carousel 32 is illustrated in dashed lines in FIG. 2.

Upon retraction of forearm portion 48, cup 60 is rotated from its initial location by carousel 32 to a customer retrieval location as indicated by cup 60 in solid lines in FIG. 2. When cup 60 is positioned in the customer retrieval position, a customer is able to collect the product from carousel 32. The primary consideration in using carousel 32 and counter 14 is that these elements prevent customers from interfering with the operation of robot 10 and further assures customer safety.

Figure 3:
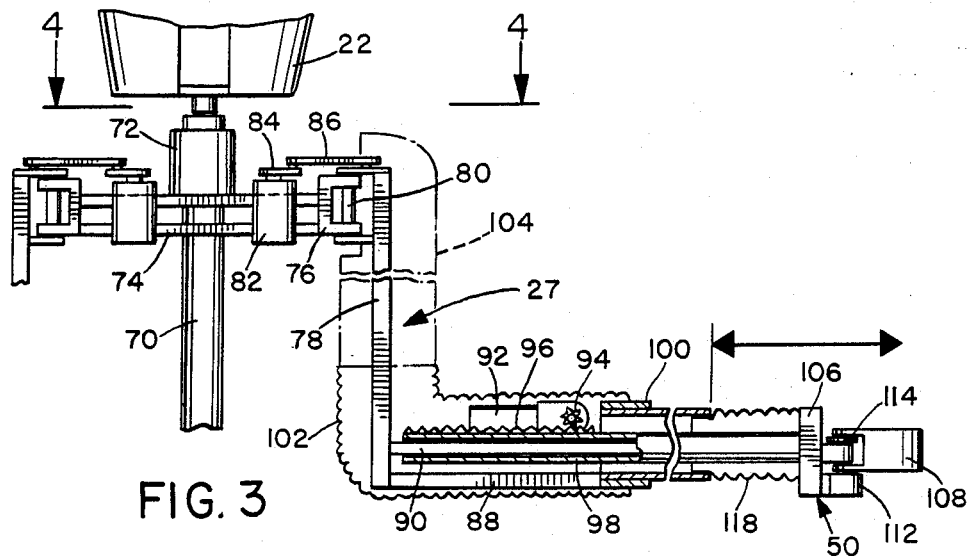
FIG. 3 is a rear elevation view of the head and arm actuating structure, portions being cut away to show the robotic mechanisms.
Figure 4:
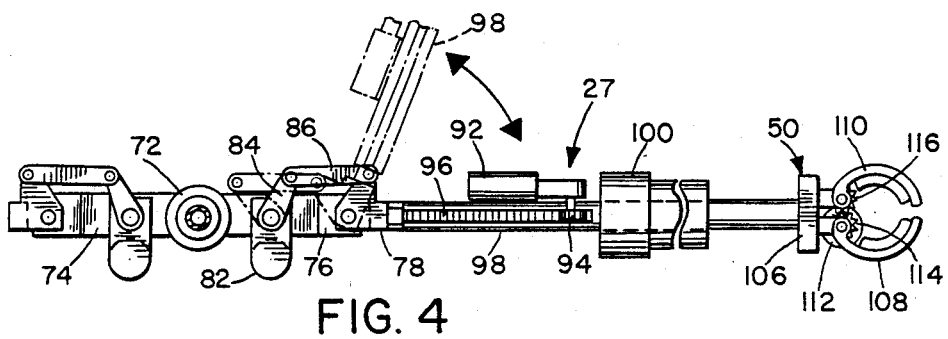
FIG. 4 is a top plan view of the structure of FIG. 3.

Referring to FIGS. 3 and 4, one type of robotic mechanics, of the many type of robotics known to those skilled in the art, is illustrated. However, it is understood that those skilled in the art of robotics may design alternate structures which perform similar functions using the disclosure herein. The outer body portions in FIGS. 3 and 4 are removed to illustrate exemplary the robotics. The fixed outer body portions are typically formed from a material such as fiberglass or any other type of suitable rigid material while extensible sections of the outer body portions are formed from a flexible material such as rubber.

Robot 10 is supported by vertical frame member 70 which has mounted at an upper end thereof motor 72. The shaft of motor 72 is coupled to head 22 to provide side to side rotation of head 22. Also mounted upon frame 70 is a horizontal shoulder frame 74. Since both arms 27 and 28 are identical in construction, the details of only one arm is described herein. Mounted at one end of frame 74 is bracket 76. Vertically positioned upper arm member 78 is pivotally coupled by pin 80 to bracket 76. Pin 80 defines a vertical axis about which upper arm member 78 pivots or rotates. Motor 82 is also mounted upon shoulder frame 74 and has a rotatable shaft coupled to one end of arm 84. The other end of arm 84 is pivotally connected to one end of lever 86. The other end of lever 86 is coupled to the end of upper arm member 78 adjacent bracket 76.

The lower end of upper arm member 78, i.e. the end opposite the coupling to bracket 76, is connected to a horizontal forearm member 88 and a guide bar 90. Motor 92 is mounted upon forearm member 88 with the shaft of motor 92 being coupled to gear 94. Gear 94 engages a toothed-rack 96 which is mounted to the exterior surface of sliding sleeve 98. Sliding sleeve 98 is slidably mounted upon guide bar 90. The teeth of rack 96 engage with gear 94 such that rotation of gear 94 by motor 92 moves sliding sleeve 98 along guide bar 90. The movement of sliding sleeve 98 provides the extension of the robot forearm portion. Fixed sleeve 100 is coupled at the end of forearm member 88 opposite upper arm member 78. Fixed sleeve 100 is used to support tubular covering 102 which is illustrated in dashed lines in FIG. 3. Covering 102 covers the forearm robotics and a lower portion of upper arm member 78. The upper portion of upper arm member 78 is covered by rigid tubular casing 104. Covering 102 overlaps the intersection of covering 102 and casing 104.

Hand 50 is formed at the outermost end of elongated sliding sleeve 98 opposite upper arm member 78. Hand 50 includes a bracket 106 mounted at the end of sleeve 98. A pair of rigid, symmetrically configured fingers 108 and 110 are pivotally connected to the bracket 106. In the illustrated embodiment, fingers 108 and 110 are configured to possess substantial curvature to grasp a cup. The fingers 108 and 110 together form a generally circular configuration with the tips of the fingers being in general alignment, but not coming into contact with each other. Motor 112 is mounted upon bracket 106 and its shaft is coupled to fingers 108 and 110 by gears 114 and 116. Rotation of the shaft of motor 112 rotates gear 114 and finger 108. Gear 114 is engaged with gear 116 which rotates with gear 114. Rotation of gears 114 and 116 opens and closes fingers 108 and 110. A flexible, accordian-like tubular covering 118 is mounted between fixed sleeve 100 and bracket 106 so as to cover sliding sleeve 98.

Sliding sleeve 98 positioned upon guide bar 90 provides the extension and retraction of forearm portion 48. The rotation of arm 27 is initiated by motor 82 rotating arm 84. Rotation of arm 84 forces lever 86 to move upper arm member 78 about an axis defined by pin 80. In FIG. 4, forearm portion 48 is illustrated in the side position, while the dashed lines indicate the arm in the home position.

Figure 5:
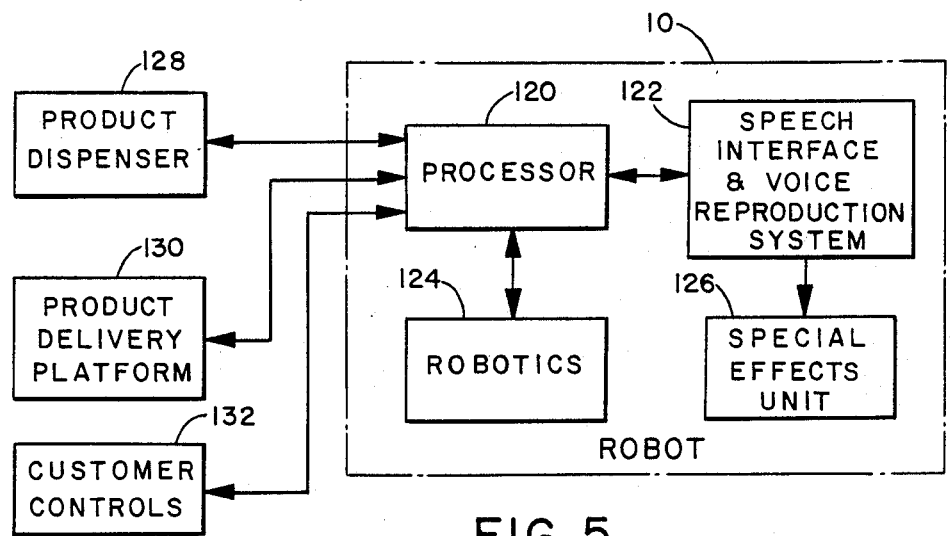
FIG. 5 is a block diagram of the basic system elements.

FIG. 5 illustrates in block diagram form the basic control elements of the robotic product server. Robot 10 is comprised of a central processor 120 that is coupled to a speech interface and voice reproduction system 122, robotics 124 and special effects unit 126. Processor 120 includes a memory for storing a programmed instruction set. Processor 120 uses the stored instruction set in controlling system 122, robotics 124 and special effects unit 126, along with interfacing and controlling external elements such as product dispenser 128, product delivery platform or carousel 130 and customer controls 132.

Processor 120 provides control signals to speech system 122 to control various types of messages that will be annunciated. Speech system 122 includes a processor, a memory and interface circuitry. The memory is used to store messages that will be annunciated to the customer. The messages are generated by accessing the memory from the system processor in response to the control signals from processor 120. Generally, messages are of a general promotional nature or are of a customer specific nature. Prerecorded messages are typically digitized and stored in a memory for use as required. It is well understood that other forms of message generation, such as digitally synthesized voice or a conventional taped prerecorded message, may be broadcast through system 122 which includes an amplifier coupled to a speaker.

Special effects unit 126 includes driver circuitry and lights which vary in intensity. These lights may be located within the eye region of the robot head. Unit 126 is responsive to a signal from system 122. For example, typically the driver circuitry may be responsive to an analog signal generated by the amplifier of system 122. The driver circuit varies the intensity of the lights according to the intensity, tone or inflection in speech as it is annunciated by system 122.

Processor 120 interacts with robotics 124 for providing motion command signals to motor controllers (not shown) which control the robotic motors. Processor 120 receives position signals from position sensors placed in the robotics for use in controlling the motors.

Processor 120 is also used to interface robot 10 to the control electronics of product dispenser 128. Furthermore, processor 120 also interfaces robot 10 to the electronics of product delivery platform 130 and customer controls 132.

Customer controls 132 includes conventional components such as a coin box and product select panel and their associated electronics. Customer controls 132 generates a payment signal in response to a customer depositing money into the coin box. Customer controls 132 also generates a selection signal upon the customer selecting the desired product. These signals are provided to processor 120 which utilizes certain ones of the programmed instructions to generate appropriate command signals. Processor 120 in response to the payment signal generates a selection request signal if a selection has not yet been made by the customer. Speech system is responsive to the selection request signal for providing an audio annunciation of a message requesting the customer to make a product selection. Upon the customer selecting the desired product by depressing a selection button, customer control 132 generates a selection signal. Processor 120 is responsive to the selection signal for generating a product dispense signal.

Product dispenser 128 is a conventional product dispenser as described previously which includes electronics for controlling mechanics which dispense a product. The product dispense signal is provided from processor 120 to the electronics of product dispenser 128. The electronics of product dispenser 128 is responsive to the product dispense signal and initiates the dispensing of the selected product. Upon completion of the dispensing of the product, a product dispense complete signal is generated by the electronics of product dispenser 128. The product dispense complete signal is provided to processor 120. Processor 120 is responsive to the payment signals and certain program instructions for sending motion command signals to the robotic motors. The motors via the motor controllers move the arm to the product dispense location and grasp the dispensing product. Processor 120 is responsive to the product dispense complete signal and certain program instructions for generating a transfer signal for controlling the robotic arm and hand to transfer the dispensed product to the product delivery platform. Upon completion of the product transfer, processor 120 generates a product delivery signal.

The product delivery platform is responsive to the product delivery signal from processor 120 for rotating the carousel to deliver the product.

With regard to robotics 124 in general, processor 120 controls robotics 124 in response to the payment signal such that robotics 124 move an arm towards the product dispenser, with the hand opening, and the forearm portion extending the hand into the product dispense location. Processor 120 in response to the product dispense complete signal controls robotics 124 such that the dispensed product is grasped and transferred to the product delivery platform. When the product is above the product delivery platform, processor 120 controls the hand opening which deposits the product on the carousel. Forearm portion is then retracted with the hand closing to return to the home position. Position sensors are used in robotics 124 to sense location of the arm and generate position signals accordingly. Processor 120 is responsive to the position signals and the other described signals and the programmed instructions in controlling robotic motion. It should be noted that processor 120 in controlling robotics 124 is capable of controlling several arms simultaneously, in addition to responding to signals from the various components.

In the system as illustrated in FIG. 1, two product dispensing machines are referenced. However, several various additional dispensing machines or types may be utilized. For example, a soda gun may be configured in each hand such that the product dispensing machine is unnecessary. In this configuration, the robot dispenses the product under program control. As illustrated in FIG. 1, the robot is capable of handling two customers simultaneously. It is preferred that the robot generate promotional messages until payment is received from either one of the customers. Typically, the robot head rotates from side to side while making the announcements. Upon payment by a customer, the robot may continue to announce promotional messages towards a side of the booth where no customer has provided payment for a product. However, when the robot head is rotated towards the customer who has provided payment, the messages are directed towards that customer.

Figure 6:
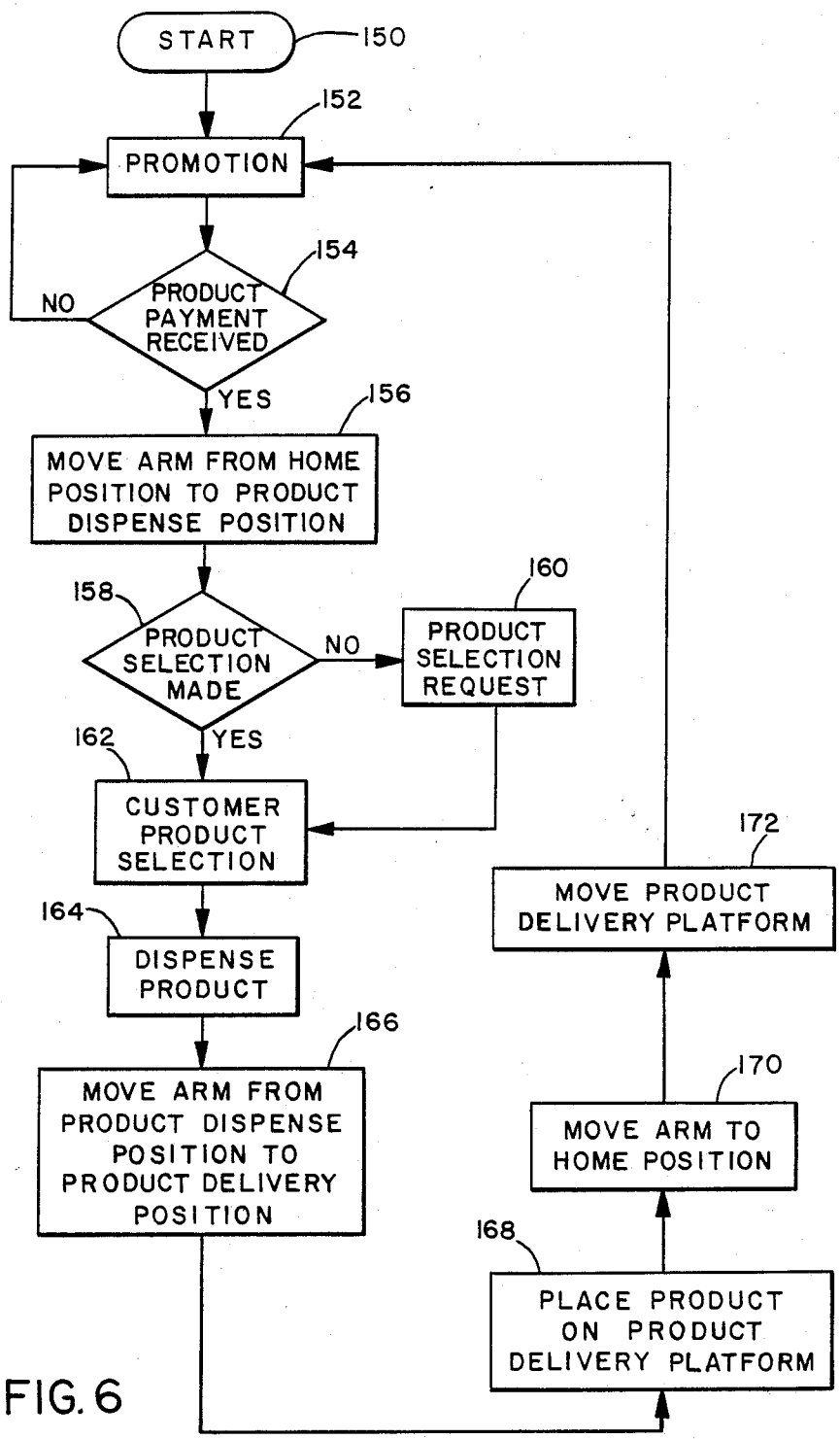
FIG. 6 is a flow diagram of the sequence of operation.

FIG. 6 illustrates a flow diagram of program states the robotic product server illustrating the operation associated with a single customer. It should be noted that simultaneous operations are available as described previously.

In FIG. 6, the robot is started or initiated at block 150. Upon initialization, the program commands the robot to undergo promotional activity, block 152. The robot during promotional activity makes promotional announcements in order to attract customers to purchase a product. While undergoing promotional activity, the robot checks to determine if a customer has made a product payment, block 154. If a product payment is not received, the robot continues the promotional announcements. However, if product payment is received, an arm is moved from the home position to a product dispense location, block 156. During this motion, the hand opens to receive the product. In addition, the robot discontinues the promotional announcements for the paying customer so as to provide customer directed announcements.

The robot determines if a product selection has been made, block 158. If the product selection has not yet been made by the customer, a product selection request is generated and a correspondence message announced by the robot, block 160, until the product selection is made by the customer, block 162. However, if the selection has already been made by the customer, block 162, no selection request and corresponding message is generated. Once the customer has selected the product, the product is dispensed, block 164.

Upon the completion of the dispensing of the product, the robotics closes the hand to grasp the product and moves the arm to remove the product from the product dispense location and place the product at product delivery location adjacent the carousel, block 166. The product is then placed upon the carousel, block 168, and the hand is opened with the forearm retracting to the home position, block 170. The carousel is then rotated to deliver the product to the customer, block 172. The robot then returns to the promotional stage for attracting another customer, block 152.

The previous description of the preferred embodiments are provided to enable any persons skilled in the art to make or use the present invention. Various modifications to these embodiments will be readily apparent to those skilled in the art, and the generic principles defined herein will be applied to other embodiments without the use of the inventive faculty. Thus, the present invention is not intended to be limited to the embodiment shown herein, but is to be accorded widest scope consistent with the principles and novel features disclosed herein.

What is claimed is:

1. A system for serving a product dispensed from a product dispenser to a customer, said system comprising:
    processing means for storing a predetermined instruction set and for generating command signals according to said instruction set;
    a product dispenser for dispensing products;
    a robot having robotic arm means responsive to certain ones of said command signals for moving said dispensed product from a product dispenser to a first position beyond reach of a customer; and
    transport means for transferring said dispensed product from said first position to a second position within reach of a customer.

2. The system of claim 1 further comprising communications means for storing a set of predetermined messages and responsive to certain other ones of said command signals for announcing selected ones of said messages.

3. The system of claim 1 wherein said product dispenser dispenses additional products with said robot further comprising at least one additional robotic arm means responsive to corresponding other certain ones of said command signals for moving a respective additional dispensed product dispensed from said product dispenser at a product dispense location to said first position beyond reach of a customer, said transport means for receiving each additional dispensed product at said first position and transferring each additional dispensed product to said second position within reach of a customer.

4. The system of claim 3 further comprising at least one additional transport means for, receiving said additional dispensed products at a corresponding first position on said at least one additional transport means and transferring each additional dispensed product to a corresponding second position.

5. A robotic system for serving a product to a customer; comprising:
    customer input means responsive to a customer input in the form of product payment and product selection for respectively generating a payment signal and a selection signal;
    processor means for storing and utilizing a set of programmed instructions for initially generating a promotional signal and in response to said payment signal generating a selection request signal, generating a dispense signal in response to said selection signal, and generating a transfer signal in response to a dispense, complete signal;
    speech means responsive to said promotional signal and said selection request signal for respectively providing audio annunciations of promotional and selection request messages;
    product dispenser means responsive to said product dispense signal for dispensing a customer selected product and for generating a product dispense complete signal upon completing the dispensing of a selected product;
    robotic arm means responsive to said transfer signal for transferring said dispensed product from said product dispenser means to a first position adjacent a customer.

6. The system of claim 5 further comprising illumination means coupled to said speech means for providing a variable illumination display.

7. The system of claim 5 wherein said speech means further comprises:
   speech memory means for storing said promotional and selection request messages;
   annunciation means for providing an audible annunciation of said promotional and selection request messages; and
   speech processing means coupled to said speech memory means and said annunciation means and responsive to said promotional and said selection request signals for accessing said speech memory means and providing corresponding ones of said promotional and selection request messages from said speech memory means to said annunciation means.

8. The system of claim 5 further comprising transport means for transferring a dispensed product from said first position to a second position adjacent a customer wherein a dispensed product in said first and second positions is respectively beyond and within reach of a customer.

9. The system of claim 8 wherein said transport means comprises a rotatable carousel upon which a dispensed product is placed at said first position, with said carousel rotating so as to transfer a dispensed product to said second position.

10. The system of claim 8 wherein said processor means further generates a product delivery signal upon completion of said product transfer to said first position, said transport means responsive to said product delivery signal for transferring a dispensed product from said first position to said second position.

11. The system of claim 10 wherein said transport means comprises a rotatable carousel upon which a dispensed product is placed at said first position, with said carousel rotating so as to transfer a dispensed product to said second position.

12. A product serving system for dispensing and serving a product dispensed from a product dispenser to a customer, said system comprising:
   processor means for storing and executing a predetermined instruction set and for generating command signals according to said instruction set;
   robotic arm means responsive to certain ones of said command signals for moving a product dispensed from said product dispenser at a product dispense location to a transfer position adjacent a customer, said product dispense location and said transfer position beyond reach of a customer; and
   transport means for, receiving said dispensed product at said transfer position and transferring said dispensed product from said transfer position to a receive position adjacent a customer with said receive position within customer reach so as to permit customer removal of a dispensed product at said receive position.

13. The system of claim 12 further comprising communications means for storing a set of predetermined messages and responsive to certain other ones of said command signals for announcing selected ones of said messages.

14. The system of claim 12 wherein said product dispenser dispenses additional products with said system further comprising at least one additional robotic arm means, said at least one additional robotic arm means being responsive to corresponding other certain ones of said command signals for moving a respective additional dispensed product from said product dispense location to a respective additional transport means at a respective additional transfer location beyond reach of a customer, said transport means for, receiving each additional dispensed product at the respective additional transfer position and transferring each additional dispensed product to a corresponding additional receive position within reach of a customer.

15. In a robotic product serving system a method for providing to a customer, upon customer request, a product dispensed from a product dispenser that is capable of dispensing a product at a product dispense location that is beyond reach of a customer and within a robotic arm member capable of transferring the dispensed product from the product dispense location to a transfer location that is beyond reach of a customer and with a delivery platform capable of receiving a dispensed product at the transfer location and transferring the dispensed product from the transfer location to a receive location within reach of a customer for customer removal thereat, comprising the steps of;
   detecting a customer request for a product to be dispensed from said product dispenser;
   moving said robotic arm member to said product dispense location upon detection of a customer request;
   dispensing a product from said product dispenser at said product dispense location;
   capturing with said robotic arm member a dispensed product at said product dispense location;
   moving said robotic arm member so as to place a dispensed product upon said delivery platform at said transfer location;
   releasing said dispensed product from said robotic arm member;
   removing said robotic arm member from said transfer location; and
   moving said delivery platform so as to place a dispensed product thereupon in said receive location.

16. The method of claim 15 wherein said delivery platform comprises a rotatable carousel, and said step of moving said delivery platform comprises rotation of said rotatable carousel through a predetermined angle of rotation.

* * * * *

UNITED STATES PATENT AND TRADEMARK OFFICE
CERTIFICATE OF CORRECTION

PATENT NO. : 4,889,210

DATED : December 26, 1989

INVENTOR(S) : Alcaraz et al.

It is certified that error appears in the above-identified patent and that said Letters Patent is hereby corrected as shown below:

Column 8, claim 5, line 66 the first "said" should be --a--.

Column 10, claim 14, line 17, before "transport" insert --additional--.

Signed and Sealed this

Seventeenth Day of December, 1991

Attest:

HARRY F. MANBECK, JR.

*Attesting Officer*

*Commissioner of Patents and Trademarks*